No. 758,844. Patented May 3, 1904.

UNITED STATES PATENT OFFICE.

GEORG LUNGE, OF ZÜRICH, SWITZERLAND, AND GEORGE PATON POLLITT, OF STANFORD LE HOPE, ENGLAND, ASSIGNORS TO VEREIN CHEMISCHER FABRIKEN IN MANNHEIM, OF MANNHEIM, GERMANY.

PROCESS OF MAKING SULFURIC ANHYDRID.

SPECIFICATION forming part of Letters Patent No. 758,844, dated May 3, 1904.

Application filed October 5, 1903. Serial No. 175,876. (No specimens.)

*To all whom it may concern:*

Be it known that we, GEORG LUNGE, a citizen of Switzerland, residing at Zürich, Switzerland, and GEORGE PATON POLLITT, a subject of the King of England, residing at Stanford le Hope, Essex, England, have invented certain new and useful Improvements in Manufacturing Sulfuric Anhydrid, of which the following is a specification.

This invention relates to improvements in the well-known process of manufacturing sulfuric anhydrid, in which process the gases containing sulfurous acid and air or the gases derived from ore-roasting are passed over a heated metallic oxid, (such as ferric oxid,) acting as a contact substance, the object of the said improvements being to render the contact substance more efficient in its action. It has been found that the presence of arsenic in the said contact substance increases its catalytic action, and in accordance with the present invention the contact substance used is metallic oxid, such as ferric oxid or a mass containing such oxid, (such as the residue of the calcination of pyrites,) this oxid or mass being prior to its use charged with arsenic. I will presume that the oxid used is ferric oxid. In the process disclosed in the German specification No. 107,995 arsenic from the gases of the roasting operation is supplied little by little to the contact mass of ferric oxid, so that the said gases are freed of the arsenic which they contained; but the absorption of the arsenic is restricted to the lower layers, (see German specification No. 108,445,) while the layers above them take less and less arsenic, the topmost being free from arsenic. The thorough impregnation of the whole mass of ferric oxid with arsenic cannot take place when the process disclosed in the aforesaid German specification is used, because after the contact mass has been in use for some time it is removed from below, fresh contact substance being added from above. The gases from the roasting operation on passing through the contact-chamber therefore always meet layers of the contact mass which are free of arsenic. In the lower layers that are charged with arsenic the percentage of sulfuric anhydrid obtained will be above the maximum obtainable when pure ferric oxid is used; but then the percentage of yield decreases in the succeeding layers of ferric oxid free from arsenic. In order to obviate these disadvantages and to keep the whole of the contact mass charged with arsenic, the process disclosed in the aforesaid German specification is in accordance with this invention modified as follows: The contact-chamber instead of being charged from above with a contact substance free from arsenic is charged with a contact mass which contains arsenic. If the contact mass available contains no arsenic or insufficient arsenic, some may be added to it by mixing it with arsenious acid or with arsenic acid. This addition of arsenic to the contact mass must not, of course, be carried to such an extent that it loses its power to absorb further arsenic from the gases from the roasting operation, so as to free them of the arsenic which they contain. If a contact substance containing arsenic be available, care must be taken, if necessary, to mix with such contact substance some contact substance free of arsenic in quantity such as will make the resulting mixture capable of absorbing a considerable amount of arsenic from the gases from the calcinating operation. As previously set forth, the absorption of arsenic from the gases by the contact substance is well known in the art and the amount of arsenic which the substance is required to absorb depends upon the ore from which the gases are derived, some containing larger amounts of arsenic than others. The amount of arsenic which may be contained in the contact substance upon its entrance into the process varies very widely and must be determined for each particular case. This will readily be done by persons skilled in the art.

To further illustrate the process, the following example may be given: In case three thousand kilograms of pyrites containing one-half per cent. of arsenic—that is, fifteen kilograms—are roasted thoroughly within twenty-four hours, (it being supposed that the roasting-gases which pass the contact-space during twenty-four hours contain ten kilograms arsenic,) then about ten kilograms of the arsenic will pass over to the gases or fumes, while the rest remains in the "burnt ore." The contact-space for peroxid of iron consists in a shaft or tunnel through which the gases or fumes pass from the top to the bottom. This contact-space is charged with peroxid of iron, care being taken that this peroxid of iron contain five per cent. of arsenic not only in the lower layers, but also in the upper layers. Now the roasting process will commence, during which the lower layers of the arsenical contact material in the contact-space will be impregnated with the arsenic carried with the gases or fumes and given off by the latter. After twenty-four hours, when the lower layers of the arsenical material will have taken up ten kilograms of arsenic from the passing gases or fumes, they are removed in the weight of four hundred kilograms, so that four hundred kilograms of a fresh charge will have to be introduced at the top. These four hundred kilograms are composed of two hundred kilograms of the contact material removed at the bottom and of two hundred kilograms of the fresh-burnt ore. Now that the two hundred kilograms of the contact material enriched with arsenic are mixed with the two hundred kilograms of burnt ore containing no arsenic it follows that the whole mixture will again contain five per cent. of arsenic. Thus while in the old process during the working in the contact-space there was in the lower part arsenical peroxid of iron, but in the upper part peroxid of iron free from arsenic, in the new process, on the contrary, the roasting-furnace will contain throughout peroxid of iron with at least five per cent. of arsenic.

What we claim, and desire to secure by Letters Patent, is—

1. The process of manufacturing sulfuric anhydrid which consists in adding a sufficient amount of substance containing arsenic to a metallic oxid to form a contact substance containing throughout a greater percentage of arsenic than fresh-burnt ore, and passing gases derived from ore-roasting over said substance, substantially as described.

2. The process of manufacturing sulfuric anhydrid which consists in adding a sufficient amount of substance containing arsenic to ferric oxid to form a contact substance containing throughout a greater percentage of arsenic than fresh-burnt ore, and passing gases containing sulfurous acid and air over said substance, substantially as described.

3. The process of manufacturing sulfuric anhydrid which consists in adding a sufficient amount of substance containing arsenic to ferric oxid to form a contact substance containing throughout a greater percentage of arsenic than fresh-burnt ore, and passing gases derived from ore-roasting over said substance, substantially as described.

4. The process of manufacturing sulfuric anhydrid which consists in passing gases derived from ore-roasting over a contact substance consisting of a metallic oxid and five per cent. or more of arsenic in all its parts, substantially as described.

5. The process of manufacturing sulfuric anhydrid which consists in passing gases containing sulfurous acid and air over a contact substance consisting of ferric oxid and five per cent. or more of arsenic in all its parts, substantially as described.

6. The process of manufacturing sulfuric anhydrid which consists in passing gases derived from ore-roasting over a contact substance consisting of ferric oxid and five per cent. or more of arsenic in all its parts, substantially as described.

7. The process of manufacturing sulfuric anhydrid which consists in passing gases derived from roasting ores over a contact substance, removing said contact substance and supplying new contact substance containing throughout a greater percentage of arsenic than fresh-burnt ore, consisting of a mixture of the substance removed and fresh-burnt ore, substantially as described.

8. The process of manufacturing sulfuric anhydrid which consists in passing gases containing sulfurous acid, air and arsenic over a contact substance containing ferric oxid, removing said contact substance and supplying new contact substance containing throughout a greater percentage of arsenic than fresh-burnt ore, consisting of a mixture of the substance removed and fresh-burnt ore containing ferric oxid, substantially as described.

9. The process of manufacturing sulfuric anhydrid which consists in roasting pyrites, passing the gases derived therefrom and air over a contact substance consisting of burnt pyrites, removing said contact substance and supplying new contact substance containing throughout a greater percentage of arsenic than fresh-burnt ore, formed by mixing the contact substance removed with fresh-burnt pyrites, substantially as described.

In testimony whereof we have signed our names to this specification in the presence of the subscribing witnesses.

GEORG LUNGE.
GEORGE PATON POLLITT.

Witnesses for Georg Lunge:
CARL SCHWEIZER,
ATTORINO SCHULTHESS.
Witnesses for George Paton Pollitt:
HUGH RHODE,
ARTHUR THOMAS ETHERIDGE.